United States Patent [19]

Craft

[11] Patent Number: 4,743,001
[45] Date of Patent: May 10, 1988

[54] HYDRAULIC WORK SUPPORT WITH LOCKING PLUNGER

[75] Inventor: Roger L. Craft, Emporia, Kans.

[73] Assignee: Vektek, Inc., Emporia, Kans.

[21] Appl. No.: 61,590

[22] Filed: Jun. 15, 1987

[51] Int. Cl.$^4$ ............................................. B23Q 3/10
[52] U.S. Cl. ..................................... 269/22; 269/296; 269/309
[58] Field of Search ........................ 269/20, 22, 27, 30, 269/289, 287, 296, 309, 310; 188/67, 129

[56] References Cited

U.S. PATENT DOCUMENTS

| | | |
|---|---|---|
| 3,542,354 | 11/1970 | Fitzpatrick ............................ 269/22 |
| 3,729,185 | 4/1973 | Roeske . |
| 3,938,798 | 2/1976 | Solle . |
| 4,396,186 | 8/1983 | Solle . |

FOREIGN PATENT DOCUMENTS

| | | |
|---|---|---|
| 1901283 | 7/1970 | Fed. Rep. of Germany ...... 269/310 |
| 2338903 | 2/1974 | Fed. Rep. of Germany ...... 269/310 |

*Primary Examiner*—Robert C. Watson
*Attorney, Agent, or Firm*—Hovey, Williams, Timmons & Collins

[57] ABSTRACT

A hydraulic work support assembly includes a externally threaded housing and a sleeve pressed into the bore of the housing which in turn receives a cylindrical plunger. The plunger may be extended to any one of a number of positions and thereafter locked in place upon application of hydraulic pressure to an annular chamber between the sleeve and the housing which causes the sleeve to contract and grip the complimental plunger. The end of the sleeve and the end of the housing lie in a common plane transverse to the central axis of the housing, and seals are carried by the housing and the sleeve adjacent the ends thereof in contact with opposite sides of an annular chamber formed in the bottom of a recess of base structure. Hydraulic fluid is admitted into the chamber through a space between end portions of the sleeve and housing in a simplified fashion which eliminates the necessity of end caps mounted within the sleeve or conventional, relatively thick housing walls which are provided with a transverse passage for admitting hydraulic fluid into the chamber. A shoulder of the housing urges the sleeve into firm, sealing contact with the bottom of the annular chamber of the base structure during tightening of the housing into the threaded recess.

10 Claims, 2 Drawing Sheets

HYDRAULIC WORK SUPPORT WITH LOCKING PLUNGER

BACKGROUND OF THE INVENTION

1. Field of the Invention

The present invention broadly concerns a hydraulic work support having a plunger shiftable within a bore of a housing, wherein a fixed sleeve surrounding the plunger is radially deformable under the influence of hydraulic pressure to lock the plunger in any one of a number of extended positions. More particularly, the present invention is directed toward a work support assembly wherein all porting for the assembly is located at the end of the housing and hydraulic fluid is admitted along a path between the sleeve and the housing in a direction parallel to the central axis of the bore, in order to facilitate installation of the assembly in a wide variety of base structures and with a minimum number of components.

2. Description of the Prior Art

A variety of adjustable work supports are known to those in the art and are oten used in situations where it is advantageous to support a work piece at an intermediate location during the work operation. For the most part, these devices include a plunger which is longitudinally shiftable to move to a position of contact with the workpiece; also, a locking means is provided to thereafter hold the plunger in the adjusted position. In some cases, the plunger is movable under the influence of fluid pressure to engage the workpiece and a spring is provided for returning the plunger to a retracted position after the work operation is completed, while in other cases a spring of the assembly continuously biases the plunger toward an extended position and the latter is retracted by the weight of the workpiece to a desired, adjusted position for commencement of the work operation.

Certain of the known adjustable work support assemblies have an outer housing, a deformable, tubular sleeve received in a cylindrical bore of the housing, and a cylindrical plunger which is shiftable within the sleeve to a desired position for support of a workpiece. The sleeve and the bore of the housing are constructed to present an annular chamber surrounding the sleeve. Application of hydraulic fluid pressure to the chamber exerts a force directed radially inwardly on the deformable sleeve, which in turn contracts to grippingly engage the plunger and lock the same in a desired position. In this manner, a workpiece can be firmly supported at a number of spaced, intermediate locations as the work operation progresses.

One example of the aforementioned work support assemblies is described in U.S. Pat. No. 3,729,185, dated Apr. 24, 1973. In U.S. Pat. No. 3,729,185, hydraulic fluid is admitted to an annular space between a deformable sleeve and a housing along a passageway which extends laterally through a relatively thick wall of the housing and which terminates in a port extending radially away from the housing bore. Unfortunately, a number of seals must be provided for confining the pressurized fluid within the chamber, and the location of the passageway and the port effectively precludes the use of a relatively thin, space-saving housing which could optionally be deeply recessed within an opening of a work table. Furthermore, the hydraulic fluid piping connections are lcoated at the side of the work support assembly described in U.S. Pat. No. 3,729,185 which is unsatisfacotry in situations where sufficient clearance for the hydraulic piping is unavailable.

Other work support assemblies which have been constructed in the past are provided with a somewhat thinner cylindrical housing and a threaded cap which is received in one end of a bore of a housing. An externally threaded region on the housing enables installation of the assembly on a machine table or the like. Pressurized fluid for radial contraction of a sleeve enters a space between the sleeve and the housing through a small passageway which is located in the cap and which communicates with a groove in the sleeve that extends from the cap to the chamber. However, the cap is a component which must be machined to specific tolerances thereby representing a significant portion of the cost of the overall assembly, and in addition the overall length of the device must be increased by the height of the cap which in turn causes the depth of the bore within the work table to be correspondingly lengthened.

SUMMARY OF THE INVENTION

My present invention represents a departure from past practice by provision of a simplified work support assembly which does not require the use of a separate, internally received cap for covering one end of the housing bore. The walls of the support assembly housing are relatively thin and can be threaded for ready installation of the assembly on a work table, while all porting for the assembly communicates with fluid passageways that are formed in a work table or base and that are located adjacent a recess which receives an end of the housing. Advantageously, the base for the assembly may comprise a relatively small, separate component or constitute part of a larger fixture or work table since in either instance the configuration of the recess receiving the housing and the porting for directing pressurized fluid to the assembly represents a substantially identical, simplified construction.

More particularly, both the housing and the tubular sleeve of the work support assembly of my present invention include enlarged end portions which present ends that lie in a common reference plane that is transverse to the central axis of the bore. The end portion of the sleeve and housing are each received in a trepanned recess of the base structure and a small passage formed in the base structure transmits hydraulic fluid pressure directly from the recess to a passageway between the sleeve and the housing that communicates with an annular chamber surrounding the middle regions of the sleeve. The end portion of both the housing and the sleeve present shoulders for receiving respective annular seals in order to confine the hydraulic fluid to the space between the sleeve and the housing.

In preferred embodiments of the invention, the end portion of the sleeve is of a diameter to present an interference fit with adjacent cylindrical regions of the housing end portion so that the sleeve conveniently remains in place within the housing before installation of the assembly on the work table. Furthermore, the housing may include a wall within the bore that extends transversely to the central axis of the bore and which engages a shoulder presented by the end portion of the sleeve. As the assembly housing is installed and tightened within the threaded recess of the base, the transverse wall of the housing simultaneously urges the end of the sleeve into firm, sealing contact with the bottom of the recess.

Other advantages of my invention will be apparent when the following detailed description is read in connection with the accompanying drawings.

DETAILED DESCRIPTION OF THE DRAWINGS

Figure 1:
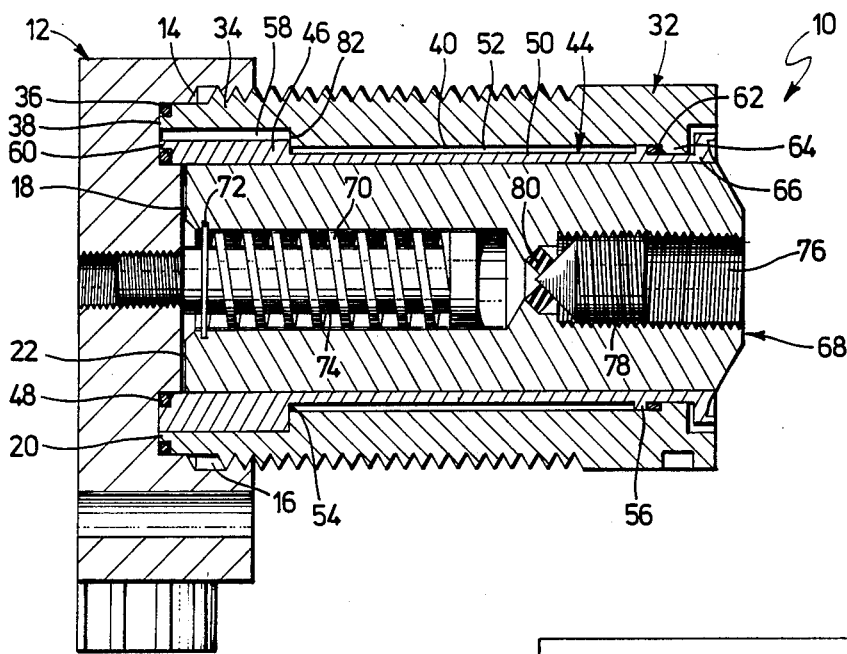
FIG. 1 is a side cross-sectional view of the hydraulic work support assembly of my present invention, illustrating a base, a housing threadably received in the base, a tubular sleeve disposed within a bore the housing, and a shiftable, work supporting plunger received within the tubular sleeve.

A hydraulic work support assembly of the present invention is shown in FIGS. 1-4 and is designated broadly by the numeral 10. A base structure or base 12 of the assembly 10 is depicted as relatively small, separate component but optionally the base 12 may comprise a portion of a much larger fixture or table for supporting workpieces during a work operation.

The base 12, in more detail, has side walls 14 defining a recess 16 having a bottom 18. The bottom 18 is trepanned to present an annular channel 20 that surrounds a central, raised region 22 laterally spaced from the bottom 20.

Figure 2:
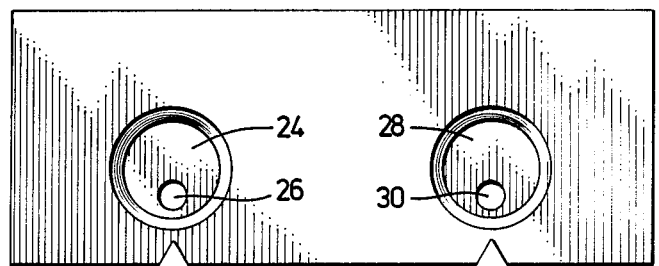
FIG. 2 is a bottom view of the base shown in FIG. 1 illustrating the ports for admitting pressurized air as well as hydraulic fluid.
Figure 3:
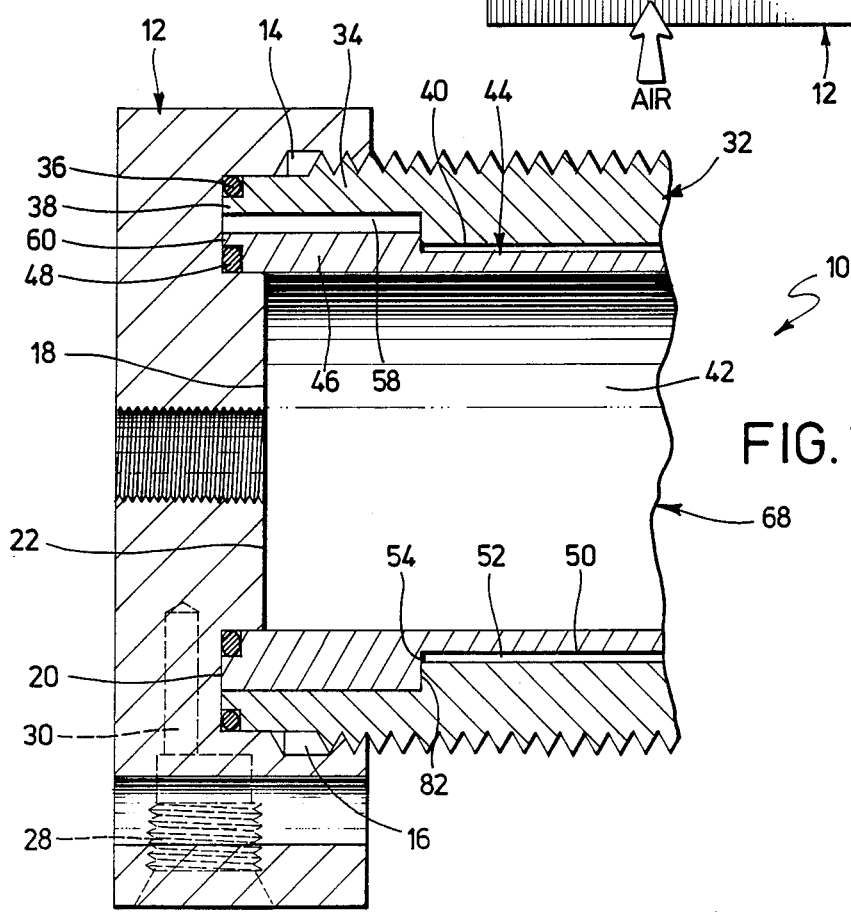
FIG. 3 is an enlarged, fragmentary, side cross-sectional view somewhat similar to FIG. 1 and taken partially along line 3—3 of FIG. 4, depicting in dashed lines the disposition of a passage leading from one of the ports to direct pressurized hydraulic fluid to the center of an annular channel formed in the bottom of a recess of the base.
Figure 4:
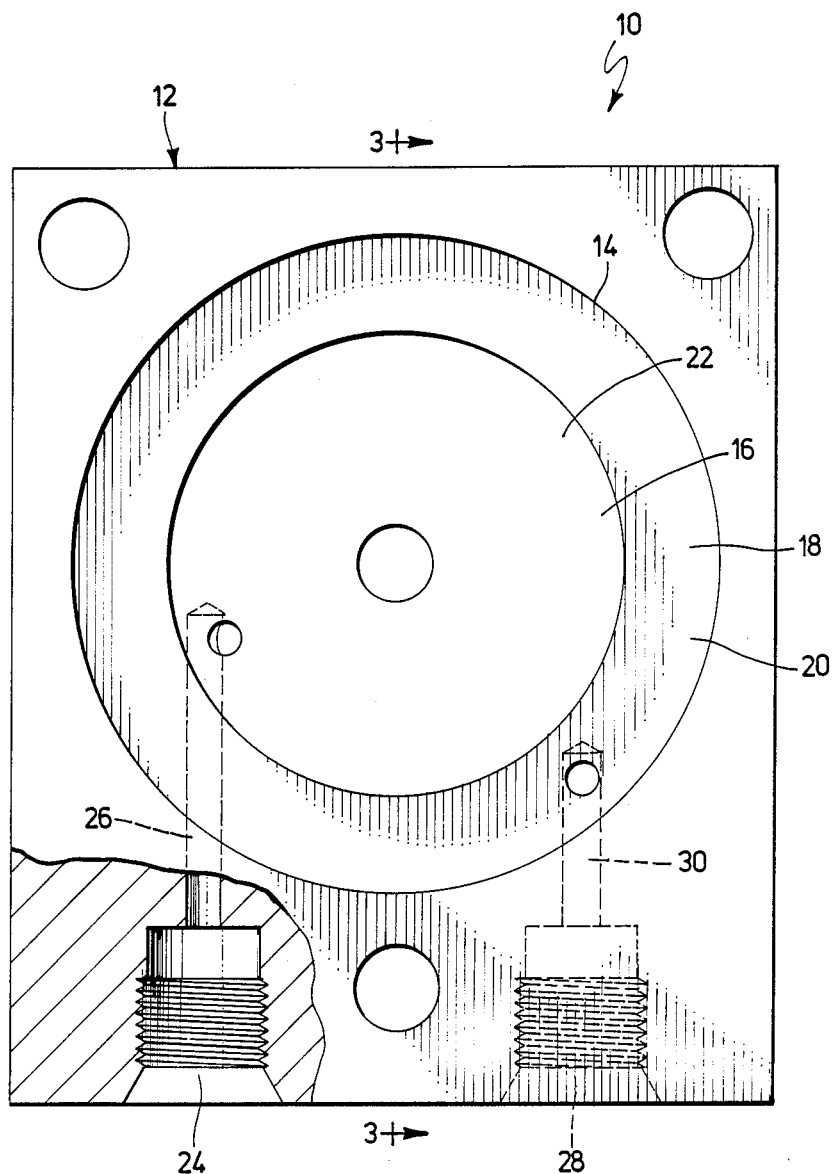
FIG. 4 is an enlarged, front elevational view of the base depicted in FIGS. 1-3 with parts broken away in section to reveal the configuration of the air inlet port which communicates with a central, raised region of the base recess.

Comparing FIGS. 2 and 4, the base is formed to present an air inlet port 24 which communicates with an elongated passage 26 that, in turn, leads to an opening in the raised region 22 of the recess 16. In addition, an oil inlet port 28 is formed in the base 12 and communicates with an elongated passage 30 which extends to an opening formed approximately mid-way across the width of the bottom of channel 20 (see also FIG. 3).

Referring to FIGS. 1 and 3, an elongated, generally cylindrical housing 32 includes an end portion 34 that is provided with threads complimental to a threaded area of recess walls 14. The end portion 34 is formed to present a shoulder that receives an O-ring 36 in sealing contact with both the bottom 18 and side walls 14 of recess 16. In addition, an annular, flat end 38 of the end portion 34 is disposed between the O-ring 36 and inner, substantially cylindrical walls 40 of the housing 32 which present a generally cylindrical bore 42.

A tubular sleeve 44 is received in the bore 42 and has an enlarged end portion 46 adjacent the end portion 34 of housing 32. An end-most, inner region of the end portion 46 presents a shoulder that receives an O-ring 48 in sealing contact with the inner, sidewall of the recess channel 20. The end portion 46 of the sleeve 44 and the end portion 44 of the housing 32 combine to present a width of a certain dimension that is approximately equal to the transverse, or radial width of the channel 20.

The sleeve 44 has structure 50 that partially defines an annular chamber 52 surrounding the sleeve 44 and inwardly of the housing walls 40 defining bore 22. The chamber 52 is closed on one end by an annular shoulder 54 presented by sleeve end portion 46, and on the opposite end by a circumscribing flange 56 integral with housing 32. An elongated passageway 58 formed in the sleeve end portion 46 extends from the chamber 52 to an annular, flat end 60 presented by the sleeve end portion 46 next to O-ring 48. The outwardmost end of passageway 58 is slightly undercut at an angle in order to communicate the latter with chamber 52.

Referring now to FIG. 1, the outer end of the flange 56 of housing 32 is in compressive engagement with an O-ring 62 that is also in firm contact with an inwardly extending flange 64 of housing 32 adjacent bore 42. Outboard of flange 64, an annular wiping element 66 is received within a shoulder of housing 32.

A generally cylindrical piston or plunger 68 is disposed partially within the sleeve 44 and has an outer diameter substantially equal to the inner diameter of sleeve 44. The plunger 68 is selectively shiftable along a reference axis lying along the centrl laxis of the sleeve 44 as well as the concentric bore 42. More specifically, the plunger 68 is extendable when pressurized air is admitted through the air inlet port 24 which thereby causes air in the passage 28 and the air within the sleeve 44 adjacent the raised region 22 to likewise become pressurized.

The plunger 68 is biased toward the left viewing FIG. 1 to a retracted position by means of a spring 70 that is received within a cavity of plunger 68. One end of the spring 70 is in contact with a retaining ring 72 fixed to plunger 68 adjacent the outlet of the plunger cavity, while the opposite end of the spring 70 abuts an enlarged head of a fixed bolt 74 that is threaded into the center of the raised region 22 of base 12.

To permit installation of the bolt 74, the plunger cavity is adjacent an internally threaded bore 76 (FIG. 1) of plunger 68 that is normally closed by means of a set screw 78 in firm, sealing engagement with a gasket 80. Optionally, the threaded bore 76 outboard of set screw 78 can receive a support bolt for selectively adjusting the overall length of the assembly 10 in accordance with the distance between the base 12 and the position of the workpiece to be supported.

In use, pressurized air admitted through the air inlet port 24 extends the plunger 68 against the bias presented by spring 70 until the plunger 68 (or a support bolt received in the threaded bore 76) comes into contact with the workpiece. Next, hydraulic fluid under pressure is directed through the oil inlet port 28 and into the annular chamber 52, thereby exerting radially inwardly directed pressure upon the deformable sleeve 44 and causing the latter to constract and tightly grip the periphery of the complimentally configured plunger 68. As a consequence, the plunger 68 is now locked in the desired, extended position for commencement of the work operation on the workpiece. Once the work operation is completed, release of the hydraulic pressure within the chamber 52 causes the sleeve 44 to relax and enable the spring 70 to return the plunger 68 to the fully retracted position shown in FIGS. 1 and 3.

As can now be appreciated, the construction of the assembly 10 in accordance with the principles of the present invention is simplified in comparison to past practice. The housing 32 and sleeve 44 may be installed on the relatively small base 12 as depicted in FIGS. 1-4, or alternatively the housing 32 and sleeve 44 may be threaded into a recess formed as part of the work table or fixture. In either event, machining of the recess 16 as well as construction of the passages 26, 30 can be accomplished in relatively short order.

Also noteworthy is the fact that all of the ports 24, 28 are disposed at a convenient, out-of-the-way location. the admission of pressurised hydraulic fluid to the chamber 52 is facilitated by provision of the annular channel 20 which directs pressurized fluid from the oil passage 30 into the passageway 58 regardless of the rotative position of the housing 32 as may result when the latter is threaded into the base 12. Use of a separate cap or other type of cover for the inward end of the sleeve 44 is thereby eliminated, such that the costs of fabrication of the assembly 10 are correspondingly reduced.

Advantageously, the housing 32 is formed to present an annular wall 82 (FIGS. 1 and 3) which extends transversely to the central axis of bore 42 and which is in engagement with the shoulder 54 of end portion 46. The shoulder 54, in cooperation with the wall 82, causes the end portion 46 of sleeve 44 to be urged toward the bottom of channel 20, thereby bringing O-ring 48 into firm, sealing contact with the adjacent side of channel 20. Flange 56 is also positioned such that the O-ring 62 is compressed once the housing 32 is threaded into the recess 16 and both ends 38, 60 are in firm contact with the bottom of channel 20.

The outer diameter of the sleeve end portion 46 and the sleeve flange 64 is normally slightly larger than the inner diameter of the housing end portion 34 and the bore walls 40 respectively before reception of sleeve 44 in bore 42, so that the sleeve 44 thereby presents an interference fit with the housing 32. In this manner, installation of the assembly 10 is facilitated especially where the assembly 10 is to be shipped to the consumer without a base 12 and is to be mounted directly within a recess provided in a work table or fixture.

Importantly, the principles of the present invention can also be employed in association with a work support similar to assembly 10 but instead has a plunger which is biased outwardly by means of a spring. In this regard, the bolt 74 depicted in FIG. 1 may be replaced with a shorter bolt having an enlarged head, and the spring 70 may then be disposed in the space within the plunger cavity between the enlarged head of the shortened bolt and the set screw 78. In such alternate construction, the spring 70 continuously biases the plunger 68 in a direction away from the base 12, and the weight of the workpiece once engaged with the plunger causes the latter to shift to a proper position for support of the workpiece, whereupon hydraulic fluid pressure applied to oil inlet port 28 causes the sleeve 44 to contract and firmly secure the plunger 60 at any fixed position. Thus, in such alternate construction, all of the parts shown in FIG. 1 may be utilized with the exception of bolt 74 which is replaced with a shortened bolt. The air inlet port 24 remains open for venting of the space between plunger 68 and base 12.

I claim:

1. A hydraulic work support assembly comprising:
a base having threaded walls defining a recess presenting a bottom;
a housing having a threaded end portion received in said recess and in contact with said threaded walls, said housing also having walls defining a generally cylindrical bore extending along a central reference axis from said end portion and through said housing;
a tubular sleeve received in said bore and having structure at least partially defining an annular chamber between said sleeve and said housing walls defining said bore,
said sleeve having an end portion adjacent said end portion of said housing;
a plunger disposed at least partially within said sleeve;
structure for selectively shifting said plunger in said sleeve in a direction along said axis,
said end portion of said housing and said end portion of said sleeve each being in direct, abutting contact with said bottom of said base,
said end portion of said sleeve including means for establishing a first, generally leak-resistant seal between said sleeve and said base,
said end portion of said housing including means for establishing a second, generally leak-resistant seal between said housing and said base,
said second seal being spaced from said first seal in surrounding relationship to the latter; and
hydraulic means including means disposed in said base between said first seal and said second seal for selectively admitting pressurized hydraulic fluid to said annular chamber for exerting radial pressure on said sleeve and causing said sleeve to grippingly engage said plunger, thereby effectively locking said plunger in a pre-determined location along said axis.

2. The invention as set forth in claim 1, wherein said end portion of said sleeve and said end portion of said housing each include an annular, flat end lying in a common plane transverse to said reference axis, and wherein each of said ends is in flat contact with said bottom of said recess.

3. The invention as set forth in claim 2, wherein said end portion of said sleeve and said end portion of said housing each present a shoulder for receiving respective annular seals.

4. The invention as set forth in claim 2, wherein said bottom of said recess has a central region and has structure defining an annular channel for receiving said end of said sleeve and said end of said housing in disposition spaced from said central region in a direction along said axis.

5. The invention as set forth in claim 4, wherein said end portion of said sleeve presents an inner surface portion inwardly of said axis, and said end portion of said housing presents an outer surface portion radially outwardly of said axis, wherein said inner surface portion is located a distance of a certain dimension from said outer surface portion, and wherein said annular channel has a width approximately equal to said certain dimension.

6. The invention as set forth in claim 5, wherein said end portion of said sleeve and said end portion of said housing each present oppositely-facing shoulders for receiving respective annular seals located adjacent corresponding opposite sides of said channel.

7. The invention as set forth in claim 1, wherein said end portion of said sleeve is of a configuration to present an interference fit with said end portion of said housing, and one of said sleeve and said housing has structure defining a fluid passageway for directing pressurized fluid from said base to said annular chamber.

8. The invention as set forth in claim 1, wherein said housing includes a wall extending transversely to said axis and in engagement with said end portion of said sleeve for urging said end portion of said sleeve into firm contact with said bottom of said base as said threaded end portion of said housing is tightened into said recess of said base.

9. A hydraulic work support assembly comprising:
a base having threaded wall portions at least partially defining a recess presenting a bottom;
a housing having a generally cylindrical, externally threaded portion in contact with said threaded wall portions of said base, said housing also having an end, end walls defining a bore extending along a central axis from said end and through said housing;
a deformable, tubular sleeve received in said bore and having an end located adjacent said end of said housing;
a plunger disposed at least partially within said sleeve; structure for shifting said plunger in said sleeve in a direction along said axis,
said sleeve having structure at least partially defining a chamber between said sleeve and said bore walls for receiving hydraulic fluid pressurized to a degree sufficient to cause said sleeve to deform and grippingly engage said plunger,
said end of said housing and said end of said sleeve each abutting a common reference plane lying transverse to said central axis thereby enabling said housing and said sleeve to be
in secure contact with said bottom of said base; and
hydraulic means including means defining a passageway extending from either of said end of said housing and said end of said sleeve for admitting pressurized hydraulic fluid to said chamber.

10. The invention as set forth in claim 9, wherein said sleeve includes an end portion, and said housing includes a wall extending tranversely to said axis and in engagment with said sleeve.

* * * * *